US010809201B2

(12) United States Patent
Takeda et al.

(10) Patent No.: US 10,809,201 B2
(45) Date of Patent: Oct. 20, 2020

(54) CRYSTAL ORIENTATION DETECTING APPARATUS AND CRYSTAL ORIENTATION DETECTING METHOD

(71) Applicant: DISCO CORPORATION, Tokyo (JP)

(72) Inventors: Noboru Takeda, Tokyo (JP); Yukihiro Kiribayashi, Tokyo (JP)

(73) Assignee: DISCO CORPORATION, Tokyo (JP)

(*) Notice: Subject to any disclaimer, the term of this patent is extended or adjusted under 35 U.S.C. 154(b) by 0 days.

(21) Appl. No.: 16/446,215

(22) Filed: Jun. 19, 2019

(65) Prior Publication Data

US 2019/0391083 A1     Dec. 26, 2019

(30) Foreign Application Priority Data

Jun. 21, 2018   (JP) ................. 2018-118171

(51) Int. Cl.
*G01N 21/00*   (2006.01)
*G01N 21/84*   (2006.01)
*G01N 21/25*   (2006.01)
*G02F 1/355*   (2006.01)

(52) U.S. Cl.
CPC ............. *G01N 21/84* (2013.01); *G01N 21/25* (2013.01); *G02F 1/3551* (2013.01); *G01N 2021/8477* (2013.01); *G01N 2201/06113* (2013.01); *G02F 2202/20* (2013.01)

(58) Field of Classification Search
CPC ........................ H01L 41/22; G01N 2021/8477; G01N 21/21; G01N 21/65; G01N 2021/656

USPC ............................................. 356/31
See application file for complete search history.

(56) References Cited

U.S. PATENT DOCUMENTS

| 4,897,964 A | * | 2/1990 | Vetter | B24B 53/08 |
| | | | | 125/11.03 |
| 5,353,551 A | * | 10/1994 | Nishida | B23D 59/001 |
| | | | | 451/5 |
| 2001/0044256 A1 | * | 11/2001 | Sekiya | B23D 59/002 |
| | | | | 451/5 |

FOREIGN PATENT DOCUMENTS

JP        07146257 A     6/1995

* cited by examiner

*Primary Examiner* — Md M Rahman
(74) *Attorney, Agent, or Firm* — Greer Burns & Crain Ltd.

(57) ABSTRACT

A crystal orientation detecting apparatus for detecting a crystal orientation of a nonlinear optical crystal substrate includes a laser beam applying unit applying a linearly polarized laser beam to a surface of the nonlinear optical crystal substrate, a harmonic detecting unit detecting a harmonic produced from the nonlinear optical crystal substrate due to a nonlinear optical effect, a recording unit recording the relationship between the angular displacement through which the plane of polarization of the laser beam and the nonlinear optical crystal substrate are rotated relatively to each other, and the intensity of the harmonic, and a crystal orientation detecting unit detecting the crystal orientation of the nonlinear optical crystal substrate based on the recorded relationship.

5 Claims, 7 Drawing Sheets

US 10,809,201 B2

CRYSTAL ORIENTATION DETECTING APPARATUS AND CRYSTAL ORIENTATION DETECTING METHOD

BACKGROUND OF THE INVENTION

Field of the Invention

The present invention relates to a crystal orientation detecting apparatus for detecting the crystal orientation of a nonlinear optical crystal substrate and a crystal orientation detecting method for detecting the crystal orientation of a nonlinear optical crystal substrate.

Description of the Related Art

Surface acoustic wave (SAW) device chips for extracting electric signals in certain frequency bands, for example, are manufactured from disk-shaped single-crystal substrates made of lithium tantalate (LT: $LiTaO_3$), lithium niobate (LN: $LiNbO_3$), or the like. Since single crystals of lithium tantalate and lithium niobate are birefringent nonlinear optical crystals, substrates of such single crystals are called nonlinear optical crystal substrates. A surface of a nonlinear optical crystal substrate is processed to form circuit patterns thereon, thereby forming devices, and then the nonlinear optical crystal substrate is divided into a plurality of pieces carrying the respective devices, which serve as SAW device chips. When SAW device chips are to be manufactured from nonlinear optical crystal substrates, the nonlinear optical crystal substrates are cleaved under cleavage conditions that vary from substrate to substrate dependent on their crystal orientations. Furthermore, the device that are formed on nonlinear optical crystal substrates have their characteristics affected by their crystal orientations. Consequently, it is important that the crystal orientation of a nonlinear optical crystal substrate be identified for properly fabricating device chips having desired characteristics therefrom. In order for those who handle nonlinear optical crystal substrates to recognize particular crystal orientations thereof, nonlinear optical crystal substrates have straight cut surfaces referred to as orientation flats or cutouts referred to as notches in their circumferential edges, which indicate the crystal orientations of the nonlinear optical crystal substrates.

Recent years have seen a wider variety of demands for device chip performances and shapes. To meet those demands or for reasons regarding device chip manufacturing processes, a disk-shaped nonlinear optical crystal substrate has its outer circumferential edge portion cut off, and the smaller nonlinear optical crystal substrate is used to manufacture device chips therefrom. The smaller nonlinear optical crystal substrate is free of orientation flats or notches. During a step of producing device chip prototypes from a nonlinear optical crystal substrate, the nonlinear optical crystal substrate may be broken into individual pieces. Almost all of the individual pieces thus broken from the nonlinear optical crystal substrate are free of orientation flats or notches. It is difficult to identify the crystal orientations of nonlinear optical crystal substrate pieces that lack orientation flats or notches. One solution to accurately identify the crystal orientations of nonlinear optical crystal substrates is to use an X-ray diffractometer (see Japanese Patent Laid-Open No. Hei 7-146257), for example.

SUMMARY OF THE INVENTION

However, X-ray diffractometers are expensive and measuring steps carried out thereby are troublesome and time-consuming. Consequently, using an X-ray diffractometer in a process of manufacturing SAW device chips from nonlinear optical crystal substrates tends to lower the efficiency with which to manufacture the SAW device chips. There have been demands for apparatus for and methods of easily identifying the crystal orientations of nonlinear optical crystal substrates that lack orientation flats or notches.

It is therefore an object of the present invention to provide a crystal orientation detecting apparatus and a crystal orientation detecting method that are capable of easily identifying the crystal orientation of a nonlinear optical crystal substrate that lack an orientation flat or notch.

In accordance with an aspect of the present invention, there is provided a crystal orientation detecting apparatus for detecting a crystal orientation of a nonlinear optical crystal substrate, including a holding table having a holding surface for holding the nonlinear optical crystal substrate thereon, a laser beam applying unit applying a linearly polarized laser beam that is transmittable through the nonlinear optical crystal substrate at an output power level for developing a nonlinear optical effect when the laser beam is applied to the nonlinear optical crystal substrate, to the nonlinear optical crystal substrate held on the holding table along a direction perpendicular to a surface of the nonlinear optical crystal substrate, a harmonic detecting unit detecting a harmonic produced from the nonlinear optical crystal substrate due to the nonlinear optical effect when the laser beam is applied to the nonlinear optical crystal substrate, a recording unit recording a relationship between an angular displacement through which a plane of polarization of the laser beam and the nonlinear optical crystal substrate are rotated relatively to each other about the direction perpendicular to the surface of the nonlinear optical crystal substrate, and an intensity of the harmonic detected by the harmonic detecting unit, and a crystal orientation detecting unit detecting the crystal orientation of the nonlinear optical crystal substrate held on the holding table based on the relationship between the angular displacement and the intensity of harmonic recorded by the recording unit.

In the crystal orientation detecting apparatus, preferably, the nonlinear optical crystal substrate includes a lithium niobate substrate or a lithium tantalate substrate.

In accordance with another aspect of the present invention, there is provided a crystal orientation detecting method of detecting a crystal orientation of a nonlinear optical crystal substrate, including a laser beam applying step of applying a linearly polarized laser beam that is transmittable through the nonlinear optical crystal substrate at an output power level lower than a processing threshold value of the nonlinear optical crystal substrate and for developing a nonlinear optical effect, to the nonlinear optical crystal substrate along a direction perpendicular to a surface of the nonlinear optical crystal substrate, a harmonic detecting step of detecting a harmonic produced from the nonlinear optical crystal substrate due to the nonlinear optical effect when the laser beam applying step is carried out, a rotating step of rotating a plane of polarization of the laser beam and the nonlinear optical crystal substrate relatively to each other about the direction perpendicular to the surface of the nonlinear optical crystal substrate, a recording step of recording a relationship between an angular displacement through which the plane of polarization of the laser beam and the nonlinear optical crystal substrate are rotated relatively to each other, and an intensity of the harmonic detected in the harmonic detecting step, when the laser beam applying step, the harmonic detecting step, and the rotating step are repeated, and a crystal orientation detecting step of detecting the crystal orientation of the nonlinear optical crystal substrate based on the relationship recorded in the recording step.

In the crystal orientation detecting method, preferably, the angular displacement through which the plane of polarization of the laser beam and the nonlinear optical crystal substrate are rotated relatively to each other is 20° or less.

In the crystal orientation detecting method, preferably, the nonlinear optical crystal substrate includes a lithium niobate substrate or a lithium tantalate substrate.

The crystal orientation detecting apparatus according to the aspect of the present invention is able to detect a particular crystal orientation of the nonlinear optical crystal substrate. In the crystal orientation detecting apparatus, the laser beam applying unit applies the linearly polarized laser beam at the output power level for developing the nonlinear optical effect to the nonlinear optical crystal substrate. When the laser beam at a particular output power level and wavelength is applied to the nonlinear optical crystal substrate, a harmonic, i.e., a second harmonic, that is an integral multiple of the frequency of the applied laser beam is observed as being produced from the nonlinear optical crystal due to a secondary nonlinear optical effect. The intensity of the harmonic varies greatly depending on whether or not it satisfies a phase matching condition. For example, the intensity of the produced harmonic varies by rotating the plane of polarization of the laser beam applied to the nonlinear optical crystal substrate. The laser beam is applied to a nonlinear optical crystal substrate whose notch or orientation flat has not been lost while the plane of polarization is being relatively rotated, and a harmonic produced from the nonlinear optical crystal substrate is detected.

The angular displacement at the time the crystal orientation indicated by the notch or orientation flat and the plane of polarization of the laser beam intersect perpendicularly to each other is regarded as a reference angle (0°). The reference relationship between the angular displacement and the plane of polarization is recorded by the recording unit. If the notch or orientation flat of a nonlinear optical crystal substrate is lost and the particular crystal orientation indicated by the notch or orientation flat becomes unknown, the nonlinear optical crystal substrate is introduced into the crystal orientation detecting apparatus. In the crystal orientation detecting apparatus, the laser beam is applied to the nonlinear optical crystal substrate while the plane of polarization of the laser beam is being relatively rotated, and the dependency of the intensity of the harmonic produced on the angular displacement of the plane of polarization is measured. The relationship between the angular displacement and the intensity of the harmonic is recorded by the recording unit, and compared with the recorded reference relationship. Graphs representing both the relationships are of the same type except that their angular displacements are shifted from each other. The relationships are checked against each other and how much the angular displacements are shifted from each other is calculated, thereby detecting the particular crystal orientation, which would be indicated by the notch or orientation flat, of the nonlinear optical crystal substrate whose crystal orientation is unknown. The crystal orientation of the nonlinear optical crystal substrate is thus detected without using an X-ray diffractometer.

Hence, the present invention provides the crystal orientation detecting apparatus and the crystal orientation detecting method that are capable of easily identifying the crystal orientation of the nonlinear optical crystal substrate.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

An embodiment of the present invention will be described below with reference to the accompanying drawings. A crystal orientation detecting apparatus and a crystal orientation detecting method according to the embodiment are able to detect a particular crystal orientation of a nonlinear optical crystal substrate that lacks an indication such as an orientation flat, a notch, or the like indicating the particular crystal orientation. First, a nonlinear optical crystal substrate whose crystal orientation is to be detected will be described below. A nonlinear optical crystal substrate is a single-crystal substrate from which to manufacture SAW device chips for extracting electric signals in certain frequency bands, for example. A nonlinear optical crystal substrate may be a lithium tantalate (LT: $LiTaO_3$) substrate or a lithium niobate (LN: $LiNbO_3$) substrate, for example. Single crystals of materials of these substrates are birefringent nonlinear optical crystals. A surface of a nonlinear optical crystal substrate is processed to form circuit patterns thereon, thereby forming devices, and then the nonlinear optical crystal substrate is divided into a plurality of pieces carrying the respective devices, which serve as SAW device chips.

When SAW device chips are to be manufactured from nonlinear optical crystal substrates, the nonlinear optical crystal substrates are cleaved under cleavage conditions that vary from substrate to substrate dependent on their crystal orientations. Furthermore, the device that are formed on nonlinear optical crystal substrates have their characteristics affected by their crystal orientations. Consequently, it is important that the crystal orientation of a nonlinear optical crystal substrate be identified for properly fabricating device chips having desired characteristics therefrom. In order for those who handle nonlinear optical crystal substrates to recognize particular crystal orientations thereof, nonlinear optical crystal substrates have straight cut surfaces referred to as orientation flats or cutouts referred to as notches in their circumferential edges, which indicate the crystal orientations of the nonlinear optical crystal substrates.

Figure 1A:
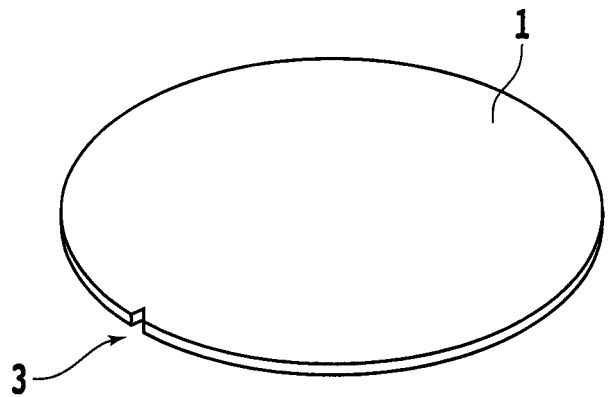
FIG. 1A is a perspective view schematically illustrating a nonlinear optical crystal substrate with a notch defined therein.
Figure 1B:
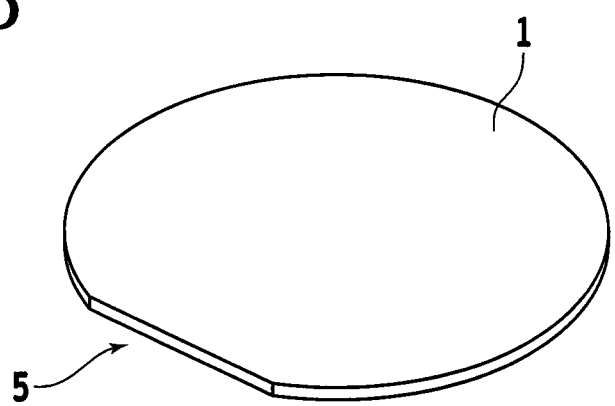
FIG. 1B is a perspective view schematically illustrating a nonlinear optical crystal substrate with an orientation flat defined therein.
Figure 1C:
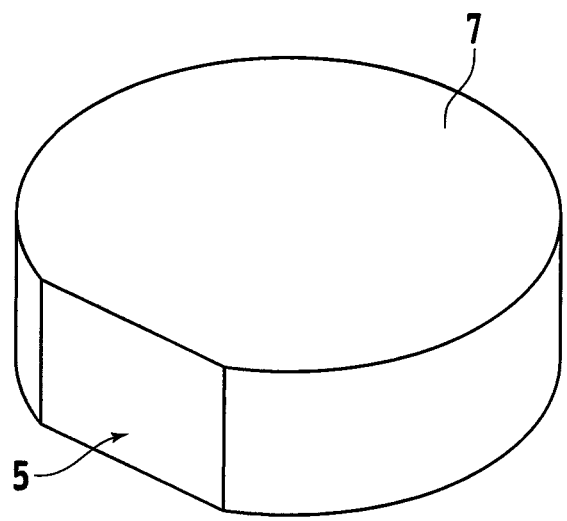
FIG. 1C is a perspective view schematically illustrating an ingot with an orientation flat defined therein.

FIG. 1A schematically illustrates in perspective a nonlinear optical crystal substrate 1 with a notch 3 defined therein. As illustrated in FIG. 1A, the notch 3 is a V-shaped cutout defined in an outer circumferential edge of the nonlinear optical crystal substrate 1. FIG. 1B schematically illustrates in perspective a nonlinear optical crystal substrate 1 with an orientation flat 5 defined therein. As illustrated in FIG. 1B, the orientation flat 5 is a straight flat surface defined in an outer circumferential edge of the nonlinear optical crystal substrate 1. FIG. 1C schematically illustrates in perspective an ingot 7 of nonlinear optical crystal to be cut into nonlinear optical crystal substrates. As illustrated in FIG. 1C, the ingot 7 has an orientation flat 5, for example, defined in an outer circumferential edge thereof. The ingot 7 is sliced into a nonlinear optical crystal substrate 1 with an orientation flat 5 defined in an outer circumferential edge thereof. The notch 3 or the orientation flat 5, which may hereinafter also be referred to as "notch 3 or the like," is formed in the ingot 7 at a position that indicates a particular crystal orientation selected to depending on the material of the nonlinear optical crystal, the use of the nonlinear optical crystal substrate 1, and design considerations of devices to be formed on the nonlinear optical crystal substrate 1. In a step of producing SAW device chips from the nonlinear optical crystal substrate 1, the position of the notch 3 or the like is referred to, and SAW devices are formed in respective positions on a face side of the nonlinear optical crystal substrate 1. Then, the position of the notch 3 or the like is also referred to, and the nonlinear optical crystal substrate 1 is divided into individual SAW device chips that include the respective SAW devices.

Figure 2A:
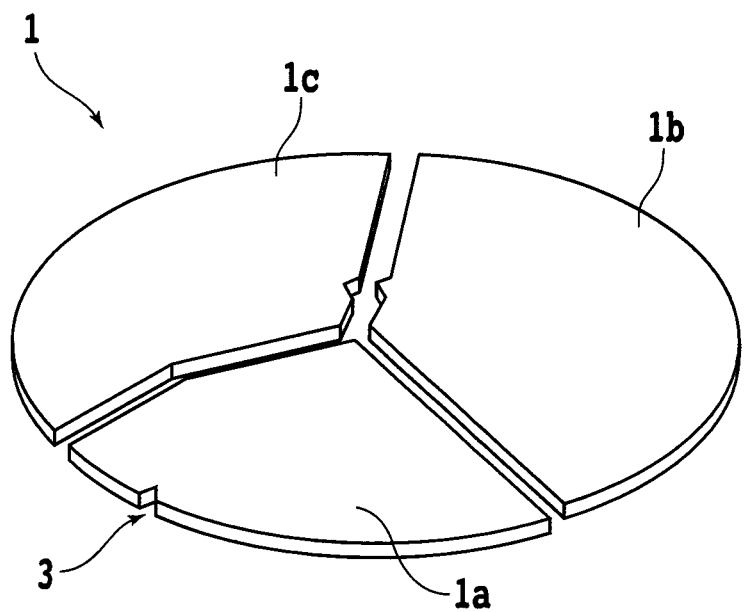
FIG. 2A is a perspective view schematically illustrating a nonlinear optical crystal substrate that has been broken into individual pieces.
Figure 2B:
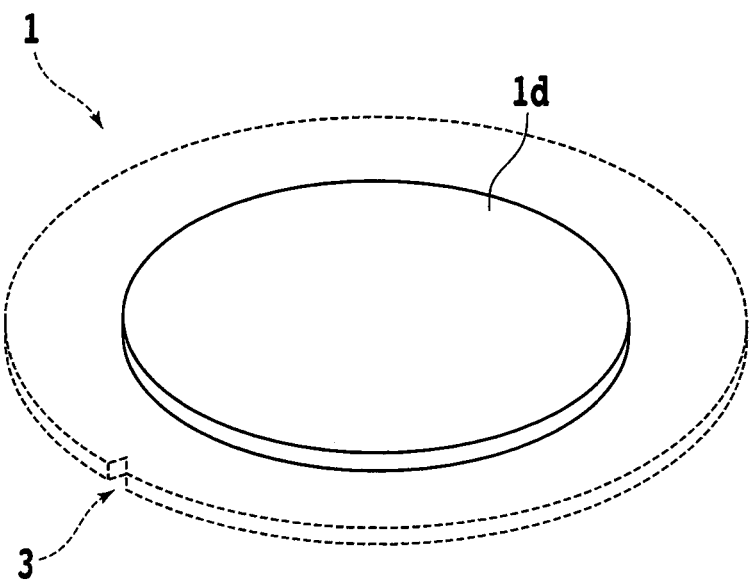
FIG. 2B is a perspective view schematically illustrating a nonlinear optical crystal substrate that has been reduced in size by having its outer circumferential edge portion cut off.

When prototypes of SAW device chips are to be produced, the nonlinear optical crystal substrate 1 may be broken into individual pieces. Recent years have seen a wider variety of demands for device chip performances and shapes. To meet those demands or for reasons regarding device chip manufacturing processes, a disk-shaped nonlinear optical crystal substrate 1 may have its outer circumferential edge portion cut off, and the smaller nonlinear optical crystal substrate may be used to manufacture device chips therefrom. FIG. 2A schematically illustrates in perspective a nonlinear optical crystal substrate that has been broken into individual pieces. FIG. 2B schematically illustrates in perspective a reduced-size nonlinear optical crystal substrate that has been produced by cutting off an outer circumferential edge portion from a larger nonlinear optical crystal substrate.

As illustrated in FIG. 2A, a nonlinear optical crystal substrate 1 with a notch 3 is broken into three individual pieces as nonlinear optical crystal substrates 1a, 1b, and 1c. As illustrated in FIG. 2A, since the notch 3 is left in the nonlinear optical crystal substrate 1a, a particular crystal orientation, indicated by the notch 3, of the nonlinear optical crystal substrate 1a can be grasped. However, particular crystal orientations of the nonlinear optical crystal substrates 1b and 1c cannot be grasped as they lack notches. As illustrated in FIG. 2B, a reduced-size nonlinear optical crystal substrate 1d has been produced by cutting off an outer circumferential edge portion from a larger nonlinear optical crystal substrate 1 that has a notch 3 defined in an outer circumferential edge thereof. Inasmuch as the reduced-size nonlinear optical crystal substrate 1d lacks the notch 3, a particular crystal orientation, which would be indicated by the notch 3, of the nonlinear optical crystal substrate 1d cannot be grasped.

In case particular crystal orientations of the nonlinear optical crystal substrate 1d cannot be grasped because of the lack of notches 3 or orientation flats 5, it is necessary to derive those particular crystal orientations again in order to produce device chips having desired performances. One solution is to use an X-ray diffractometer. However, X-ray diffractometers are expensive and measuring processes carried out thereby are troublesome and time-consuming. The crystal orientation detecting apparatus and the crystal orientation detecting method according to the present embodiment are capable of detecting crystal orientations, which would be indicated by orientation notches or orientation flats, of nonlinear optical crystal substrates.

Figure 3:
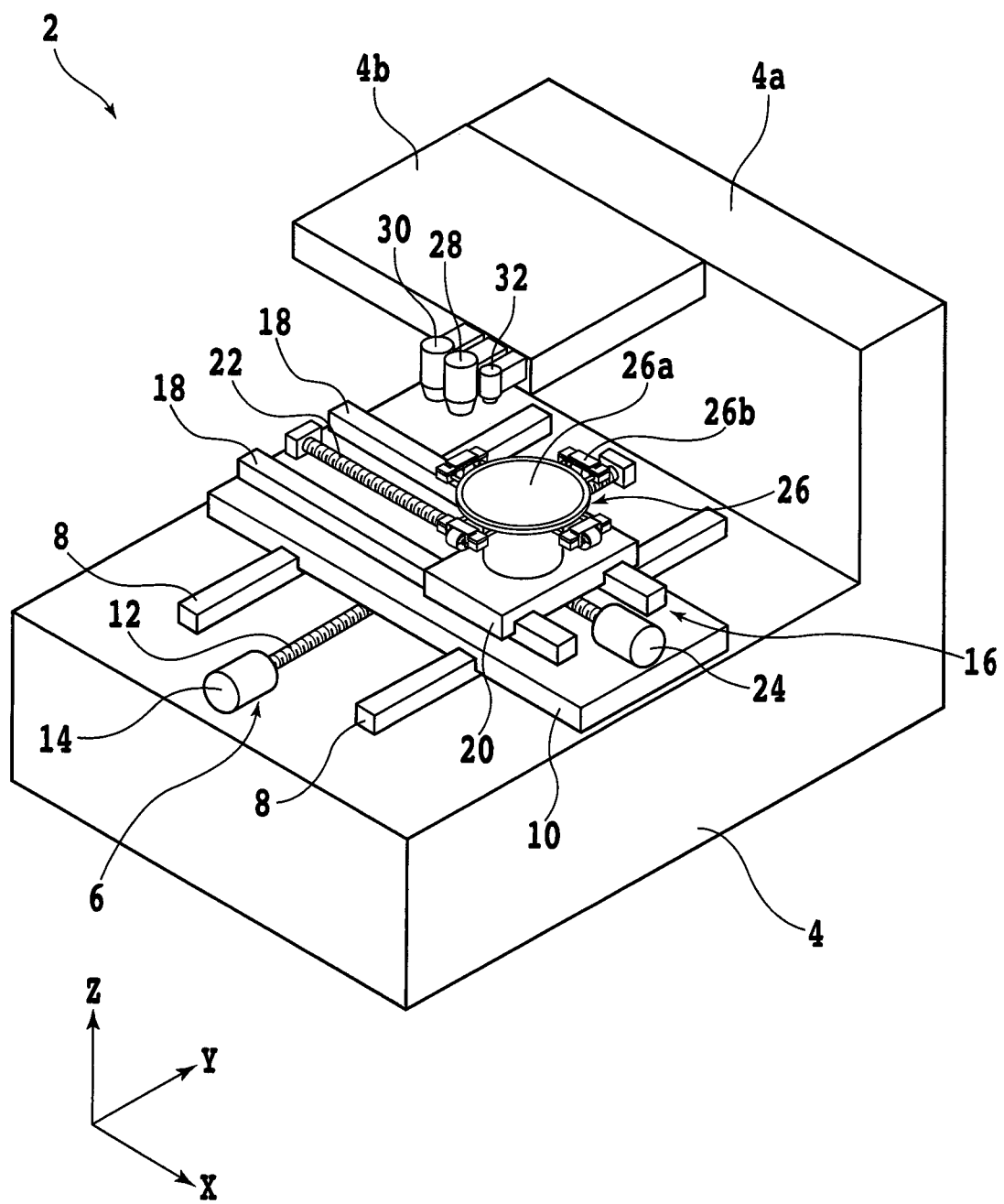
FIG. 3 is a perspective view schematically illustrating a crystal orientation detecting apparatus according to the present invention.

The crystal orientation detecting apparatus according to the present embodiment will be described below with reference to FIG. 3. FIG. 3 schematically illustrates a crystal orientation detecting apparatus, denoted by 2, according to the present embodiment. As illustrated in FIG. 3, the crystal orientation detecting apparatus 2 includes a holding table 26 for holding a nonlinear optical crystal substrate thereon, a laser beam applying unit 28 for applying a laser beam to the nonlinear optical crystal substrate held on the holding table 26, and a harmonic detecting unit 30 for detecting a harmonic generated from the nonlinear optical crystal substrate.

The crystal orientation detecting apparatus 2 includes a base 4 that supports various components thereof. Specifically, the base 4 supports on an upper surface thereof a Y-axis moving unit 6 for moving the holding table 26 in Y-axis directions (see FIG. 3). The Y-axis moving unit 6 includes a pair of Y-axis guide rails 8 extending parallel to each other in Y-axis directions, and a Y-axis movable plate 10 slidably mounted on the Y-axis guide rails 8 for movement in the Y-axis directions. A nut, not depicted, is mounted on a reverse surface, i.e., a lower surface, of the Y-axis movable plate 10 and threaded over a Y-axis ball screw 12 extending parallel to the Y-axis guide rails 8. The Y-axis ball screw 12 has an end connected to a Y-axis stepping motor 14. When the Y-axis stepping motor 14 is energized to rotate the Y-axis ball screw 12 about its own axis, the Y-axis movable plate 10 moves in one of the Y-axis directions along the Y-axis guide rails 8.

The Y-axis movable plate 10 supports on its upper surface an X-axis moving unit 16 for moving the holding table 26 in the X-axis directions. The X-axis moving unit 16 includes a pair of X-axis guide rails 18 extending parallel to each other in the X-axis directions, and an X-axis movable plate 20 slidably mounted on the X-axis guide rails 18 for movement in the X-axis directions. A nut, not depicted, is mounted on a reverse surface, i.e., a lower surface, of the X-axis movable plate 20 and threaded over an X-axis ball screw 22 extending parallel to the X-axis guide rails 18. The X-axis ball screw 22 has an end connected to an X-axis stepping motor 24. When the X-axis stepping motor 24 is energized to rotate the X-axis ball screw 22 about its own axis, the X-axis movable plate 20 moves in one of the X-axis directions along the X-axis guide rails 18.

Figure 5:
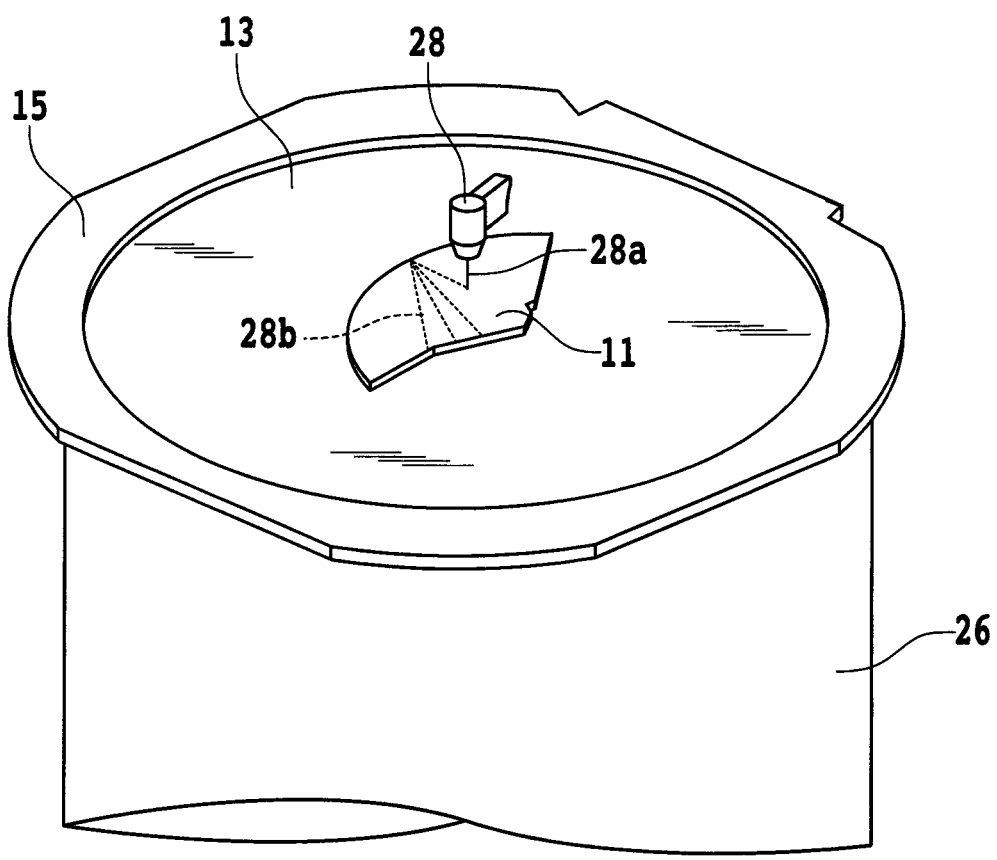
FIG. 5 is a perspective view schematically illustrating a laser beam applying step of a crystal orientation detecting method according to the present invention.

The holding table 26 that holds thereon a nonlinear optical crystal substrate whose crystal orientation is to be detected is mounted on an upper surface of the X-axis movable plate 20. A porous member is disposed on an upper surface of the holding table 26. The porous member has an upper surface serving as a holding surface 26a for holding the nonlinear optical crystal substrate thereon. As illustrated in FIG. 5, a nonlinear optical crystal substrate, denoted by 11, is stuck to a tape 13 that is bonded to an annular frame 15 in a manner to close the opening of the annular frame 15. The frame 15, the tape 13, and the nonlinear optical crystal substrate 11 are thus integrally put together, jointly making up a frame unit. The frame unit is assembled before it is placed onto the holding table 26. As illustrated in FIG. 3, a plurality of clamps 26b are disposed on an outer circumferential surface of the holding table 26 for gripping the frame 15 of the frame unit placed on the holding surface 26a of the porous member on the holding table 26. The porous member is held in fluid communication with a suction source, not depicted, through a suction channel, not depicted, defined in the holding table 26. When the nonlinear optical crystal substrate 11 is placed on the holding surface 26a with the tape 13 interposed therebetween and the frame 15 is gripped by the clamps 26b, the suction source is actuated to develop a negative pressure that acts on the nonlinear optical crystal substrate 11 through the suction channel and the porous member. The nonlinear optical crystal substrate 11 is now held under suction on the holding table 26.

The crystal orientation detecting apparatus 2 also includes an upstanding wall 4a disposed on a rear portion of the upper surface of the base 4. An arm 4b extends horizontally from an upper end of the upstanding wall 4a in overhanging relation to the holding table 26. A laser beam applying unit 28, a harmonic detecting unit 30, and a camera unit 32 are mounted on an end of the arm 4b remote from the end thereof that is connected to the upstanding wall 4a.

The laser beam applying unit 28 has a function to apply, to the nonlinear optical crystal substrate 11, a laser beam that is transmittable through the nonlinear optical crystal substrate 11 and has a wavelength for developing a nonlinear optical effect when the laser beam is applied to the nonlinear optical crystal substrate 11. Furthermore, the laser beam applying unit 28 is capable of apply the laser beam at an output power level for developing the nonlinear optical effect when the laser beam is applied to the nonlinear optical crystal substrate 11. The laser beam applying unit 28 applies the laser beam along a direction perpendicular to a face side, i.e., an upper surface, of the nonlinear optical substrate 11. In an embodiment, the laser beam applying unit 28 includes a laser oscillator and a focusing lens. Furthermore, the laser beam applying unit 28 is capable of apply the laser beam at an output power level for developing the nonlinear optical effect when the laser beam is applied to the nonlinear optical crystal substrate 11. The laser beam applying unit 28 applies the laser beam along a direction perpendicular to a face side, i.e., an upper surface, of the nonlinear optical crystal substrate 11.

The laser beam applying unit 28 applies a laser beam having a wavelength of 1064 nm oscillated through a medium of neodymium doped yttrium aluminum garnet (Nd:YAG) or the like to the nonlinear optical crystal substrate 11, for example. When the laser beam having the wavelength of 1064 nm is applied to a nonlinear optical crystal of lithium tantalate (LT), lithium niobate (LN), or the like, a harmonic that is an integral multiple of the frequency (fundamental) of the applied laser beam is observed as being produced from the nonlinear optical crystal due to the nonlinear optical effect. The observed harmonic is a second harmonic having a wavelength of 532 nm, for example. The laser beam that is emitted from the laser beam applying unit 28 is a linearly polarized laser beam whose electric field or magnetic field has oscillating directions in a plane including the direction of travel of the laser beam. In other words, the linearly polarized laser beam has a plane of polarization including the direction of travel of the laser beam. The intensity of the produced harmonic varies greatly depending on whether or not it satisfies a phase matching condition. For example, the intensity of the produced harmonic varies by rotating the plane of polarization of the laser beam applied to the nonlinear optical crystal substrate 11.

The laser beam applying unit 28 may include a half-wave plate, i.e., a λ/2 plate. If the laser beam applying unit 28 includes a half-wave plate, then it applies the laser beam through the half-wave plate to the nonlinear optical crystal substrate 11. The half-wave plate has a function to rotate the plane of polarization of the laser beam. When the half-wave plate is rotated about the direction of travel of the laser beam, the magnitude of the angular displacement of the plane of polarization varies. Therefore, the laser beam applying unit 28 can apply the linearly polarized laser beam to the nonlinear optical crystal substrate 11 with the plane of polarization rotated through a desired angular displacement, by rotating the half-wave plate. Alternatively, the holding table 26 may rotate about an axis perpendicular to the holding surface 26a. When the linearly polarized laser beam is applied to the nonlinear optical crystal substrate 11, the plane of polarization of the linearly polarized laser beam applied to the nonlinear optical crystal substrate 11 is rotated relatively to the nonlinear optical crystal substrate 11 by rotating the holding table 26. In other words, the linearly polarized laser beam can be applied to the nonlinear optical crystal substrate 11 with the plane of polarization rotated through a desired angular displacement by rotating the holding table 26.

The harmonic detecting unit 30, which is disposed near the laser beam applying unit 28, has a function to detect the harmonic that is produced due to the nonlinear optical effect at the time the laser beam is applied to the nonlinear optical crystal substrate 11. The harmonic detecting unit 30 may include a charge coupled device (CCD) detector or a complementary metal-oxide-semiconductor (CMOS) detector.

The camera unit 32, which is also disposed near the laser beam applying unit 28, can capture an image of the nonlinear optical crystal substrate 11 held on the holding table 26. If a nonlinear optical crystal substrate 1 having a notch 3 or an orientation flat 5 is held on the holding table 26, for example, the camera unit 32 can detect the notch 3 or the orientation flat 5.

Furthermore, the crystal orientation detecting apparatus 2 also includes a recording unit 34 (see FIG. 4) that is electrically connected to the harmonic detecting unit 30. The recording unit 34 includes a memory device, such as a flash memory, a hard disc drive, a read-only memory or a random access memory such as a static random access memory or a dynamic random access memory, such that the recording unit records information and stores the recorded information in the memory device. In operation, the recording unit 34 records the intensity of the harmonic detected by the harmonic detecting unit 30. In particular, the recording unit 34 records the relationship between the angular displacement of the plane of polarization of the laser beam that is relatively rotated about the direction perpendicular to the nonlinear optical crystal substrate 11 and the intensity of the harmonic detected by the harmonic detecting unit 30.

Figure 4:
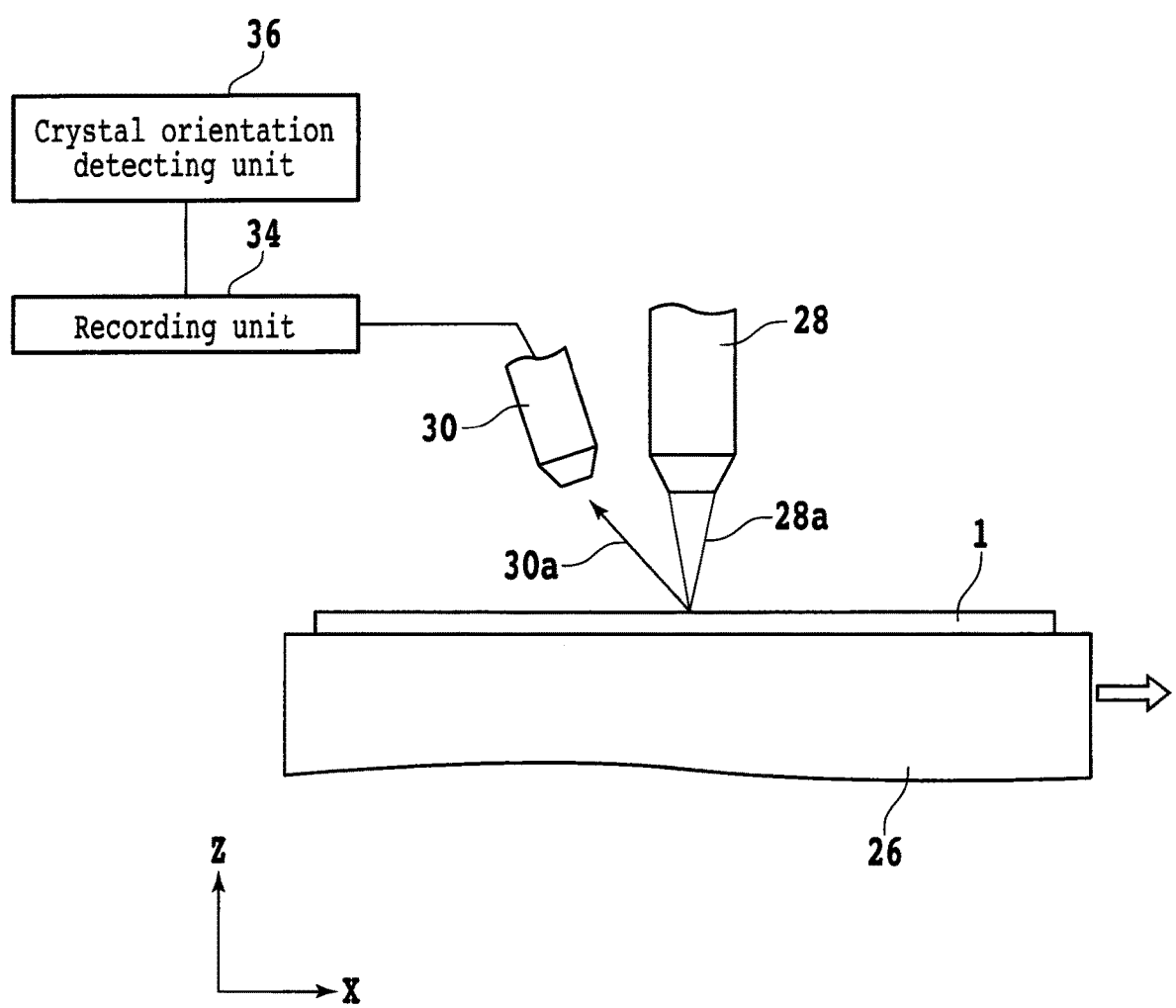
FIG. 4 is a side elevational view schematically illustrating the manner in which a laser beam is applied to a nonlinear optical crystal substrate.

FIG. 4 schematically illustrates in side elevation the manner in which a laser beam is applied from the laser beam applying unit 28 to a nonlinear optical crystal substrate 1 having a notch 3 or an orientation flat 5, prior to the detection of an unknown crystal orientation of the nonlinear optical crystal substrate 11. As illustrated in FIG. 4, when a laser beam, denoted by 28a, is applied from the laser beam applying unit 28 to the nonlinear optical crystal substrate 1, a harmonic 30a produced from the nonlinear optical crystal substrate 1 is detected by the harmonic detecting unit 30. The intensity of the detected harmonic 30a is transmitted, together with the relative angular displacement of the plane of polarization of the laser beam 28a, to the recording unit 34, which records the relationship between the angular displacement and the intensity.

For example, the angular displacement at the time the crystal orientation indicated by the notch 3 or the like and the plane of polarization of the laser beam intersect perpendicularly to each other is regarded as a reference angle (0°). The plane of polarization and the nonlinear optical crystal substrate 1 are rotated relatively to each other, and the relationships between the intensities of the harmonic 30a detected by the harmonic detecting unit 30 and the angular displacements of the plane of polarization at the time the intensities of the harmonic 30a are detected by the harmonic detecting unit 30 at the respective angular displacements are recorded by the recording unit 34. The recorded relationships are regarded as reference relationships and will subsequently be referred to. Thereafter, the nonlinear optical crystal substrate 11 that lacks the notch 3 or the like and hence whose particular crystal orientation is unknown is placed and held on the holding table 26. The laser beam 28a is then applied from the laser beam applying unit 28 to the nonlinear optical crystal substrate 11, and a harmonic 30a produced from the nonlinear optical crystal substrate 11 is detected by the harmonic detecting unit 30. The relationships between the intensities of the harmonic 30a and the angular displacements of the plane of polarization are recorded by the recording unit 34. When the laser beam 28a is applied to the nonlinear optical crystal substrate 11, and the harmonic 30a is detected by the harmonic detecting unit 30, the reference angle is regarded as any desired angle.

The crystal orientation detecting apparatus 2 further includes a crystal orientation detecting unit 36 (see FIG. 4) that is electrically connected to the recording unit 34. The crystal orientation detecting unit 36 detects the crystal orientation of the nonlinear optical crystal substrate 11 held on the holding table 26 based on the relationships recorded by the recording unit 34. Specifically, the crystal orientation detecting unit 36 checks the relationship between the intensity of the harmonic 30a obtained from the nonlinear optical crystal substrate 11 whose crystal orientation is unknown and the angular displacement of the plane of polarization, against the reference relationships obtained from the nonlinear optical crystal substrate 1 that has the notch 3 or the like. In an embodiment, the crystal orientation detecting unit 36 may include a controller in the form of a computer having a processor, such as a central processing unit (CPU), and a storage apparatus. Since the former relationship and the latter reference relationships are obtained from the nonlinear optical crystal substrates of the same kind, if those relationships are represented by graphs each having a horizontal axis that represents the angular displacement of the plane of polarization and a vertical axis that represents the intensity of the harmonic 30a, the graphs are of the same type except that their angular displacements are shifted from each other. Then, the crystal orientation, which would be indicated by the notch 3 or the like, of the nonlinear optical crystal substrate 11 whose crystal orientation is unknown can be detected by determining how much the angular displacements are shifted from each other.

As described above, the crystal orientation detecting apparatus 2 according to the present embodiment can easily identify the crystal orientation of the nonlinear optical crystal substrate 11 without using an X-ray diffractometer.

The laser beam applying unit 28 of the crystal orientation detecting apparatus 2 according to the present embodiment may be capable of applying a laser beam having an output power or wavelength for performing a laser processing operation such as ablation or the like on the nonlinear optical crystal substrate 11. By performing such a laser processing operation, the laser beam applying unit 28 can form a mark indicating the crystal orientation on the nonlinear optical crystal substrate 11 so that the crystal orientation detected by the crystal orientation detecting unit 36 will not become unknown again. Such a mark may alternatively be formed on the nonlinear optical crystal substrate 11 by any of other processes.

While the laser beam 28a is being applied from the laser beam applying unit 28 to the nonlinear optical crystal substrate 11, the X-axis moving unit 16 or the Y-axis moving unit 6 may be actuated to move the holding table 26. When the holding table 26 is thus moved, the position on the nonlinear optical crystal substrate 11 where the laser beam 28a is applied varies at all times. Therefore, the laser beam 28a is not excessively applied to certain local areas of the nonlinear optical crystal substrate 11, which is thus prevented from developing phenomena other than harmonic generation, such as material deteriorations, etc. When the harmonic 30a from the nonlinear optical crystal substrate 11 is detected, the intensities of the harmonic 30a generated therefrom at different positions thereon are measured and then averaged. The average intensity of the harmonic 30a is acquired as a highly accurate value with reduced variations as adverse effects due to local surface states of the nonlinear optical crystal substrate 11 are minimized.

Figure 6:
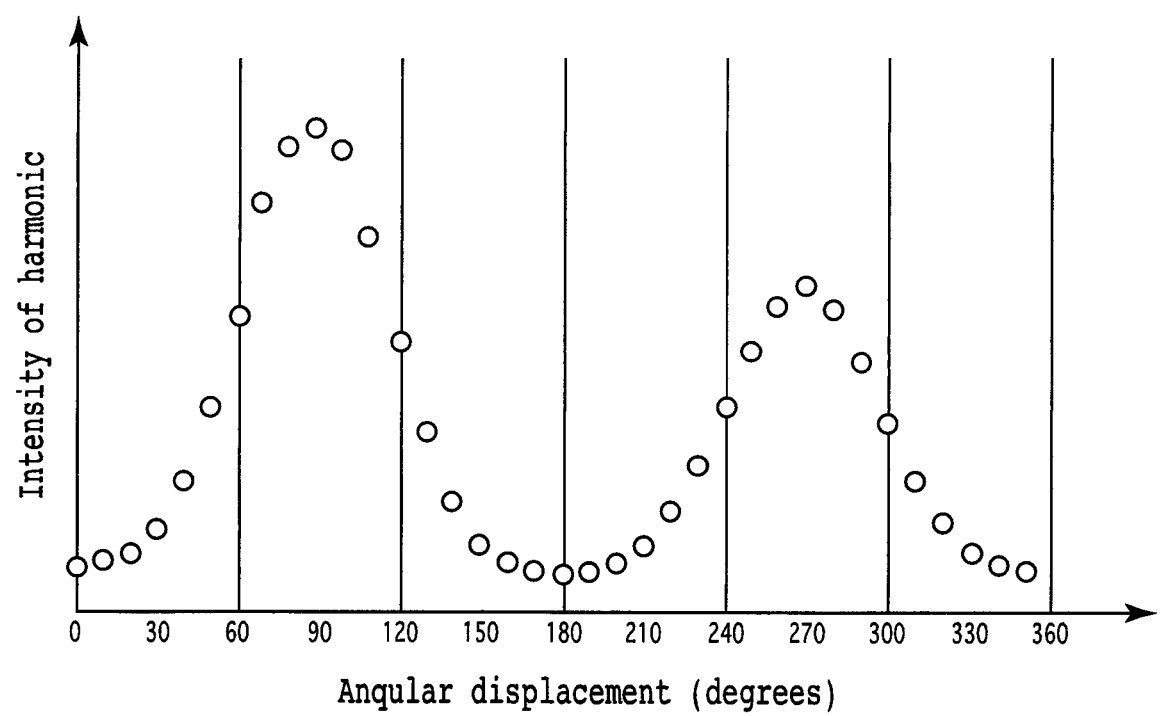
FIG. 6 is a graph schematically illustrating an example of the relationship between the angular displacement of the plane of polarization of a laser beam and the intensity of an observed harmonic.

FIG. 6 is a graph schematically illustrating an example of the relationship between the angular displacement of the plane of polarization of the laser beam 28a and the intensity of the harmonic 30a. Specifically, the graph represents the relationship between the intensity of the harmonic 30a that was actually observed and the angular displacement of the plane of polarization of the laser beam 28a when the laser beam 28a was applied to the lithium tantalate (LT) substrate with the notch 3 defined therein while the relative angular displacement of the plane of polarization of the laser beam 28a was being varied. Conditions for detecting the harmonic at the time the relationship was obtained will be described below.

First, the lithium tantalate (LT) substrate with the notch 3 defined therein was held on the holding table 26, and the linearly polarized laser beam 28a having the wavelength of 1064 nm was applied to the lithium tantalate (LT) substrate. The laser beam 28a had an output power ranging from 5 to 10 µJ and a frequency of 10 kHz. The harmonic detecting unit 30 detected a produced second harmonic having a wavelength of 532 nm. At this time, the X-axis moving unit 16 was actuated to move the holding table 26 in one of the X-axis directions at a speed of 100 mm/s while the laser beam 28a was being applied, and the intensities of the harmonic 30a detected by the harmonic detecting unit 30 were averaged. The holding table 26 was rotated about an axis perpendicular to the holding surface 26a, thereby rotating the plane of polarization of the linearly polarized laser beam 28a relatively to the lithium tantalate (LT) substrate, and the harmonic 30a was repeatedly measured in the same manner as described above. The holding table 26 was rotated at angular intervals of 10°.

The intensities of the harmonic 30a produced under the conditions described above were recorded to obtain the relationship between the angular displacement of the plane of polarization of the laser beam 28a and the intensity of the harmonic 30a. In FIG. 6, the relative angular displacement of the plane of polarization at the time the plane of polarization of the laser beam 28a and the crystal orientation indicated by the notch of lithium tantalate (LT) substrate intersect perpendicularly to each other was regarded as the reference angle (0°). The obtained relationship is referred to as a reference relationship for detecting the crystal orientation of a lithium tantalate (LT) substrate whose crystal orientation is unknown.

As illustrated in FIG. 6, it was confirmed that the intensity of the harmonic 30a depends on the angular displacement. It was also confirmed that when the angular displacement of the plane of polarization is 90°, i.e., when the plane of polarization and the crystal orientation indicated by the notch are parallel to each other, the intensity of the harmonic 30a is maximum. Incidentally, the intensities of the harmonic 30a observed respectively at two angular displacements that are 180° different from each other should be in accord with each other on principle. In FIG. 6, however, those intensities of the harmonic 30a do not agree with each other. Such a disagreement is considered to result from the quality of the laser beam 28a, etc.

The crystal orientation detecting method according to the present embodiment will hereinafter be described below. The crystal orientation detecting method is carried out using the crystal orientation detecting apparatus 2 described above, for example. The crystal orientation detecting method that is carried out using the crystal orientation detecting apparatus 2 will be described below.

Figure 7:
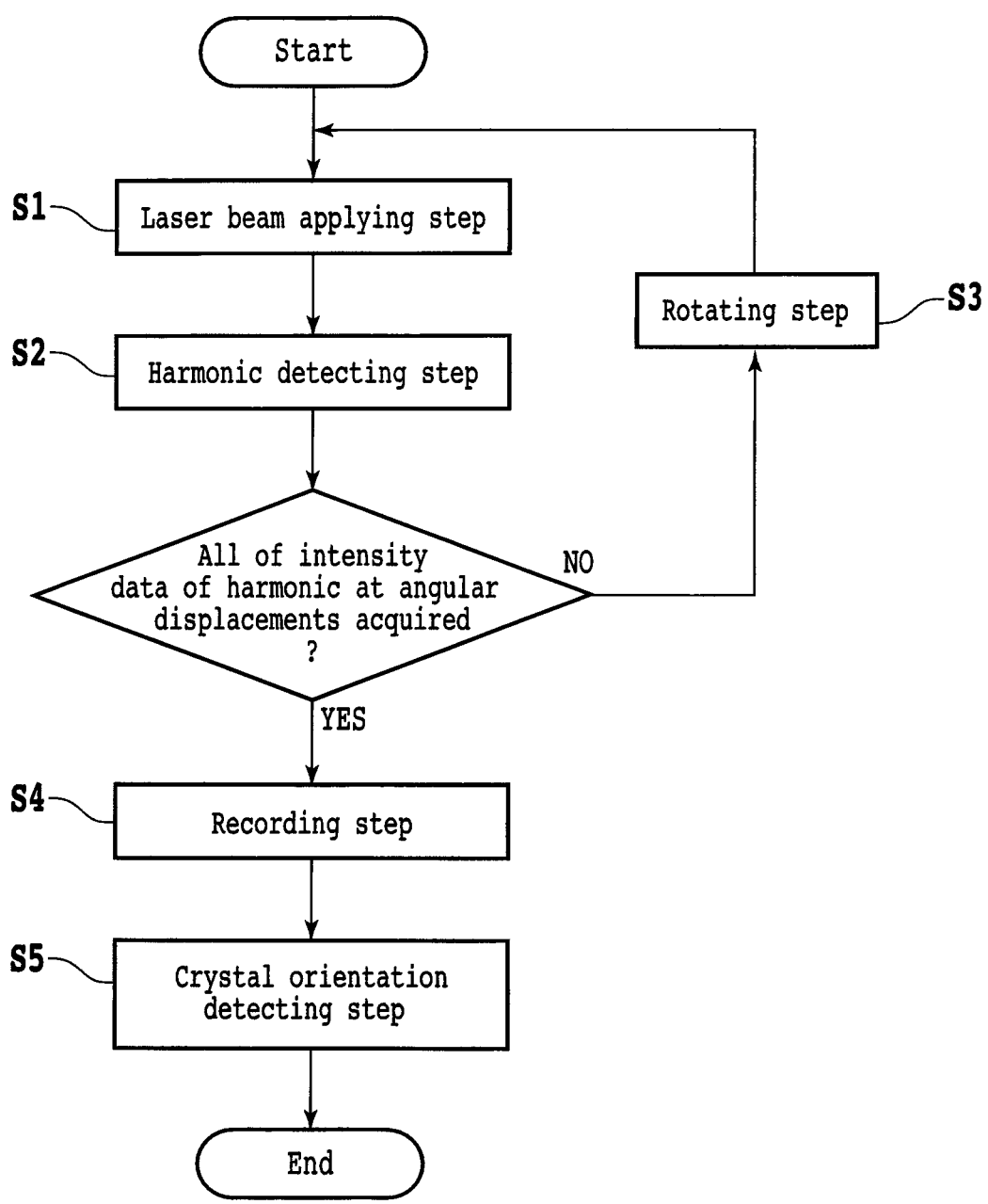
FIG. 7 is a flowchart illustrating the steps of the crystal orientation detecting method.

FIG. 7 is a flowchart illustrating the steps of the crystal orientation detecting method. The crystal orientation detecting method includes a laser beam applying step S1 of applying the laser beam 28a to the nonlinear optical crystal substrate 11 and a harmonic detecting step S2 of detecting a harmonic 30a produced from the nonlinear optical crystal substrate 11. The crystal orientation detecting method also includes a rotating step S3 of rotating the plane of polarization of the laser beam 28a relatively to the nonlinear optical crystal substrate 11. The laser beam applying step S1, the harmonic detecting step S2, and the rotating step S3 are repeated to acquire all of intensity data of the harmonic 30a at respective angular displacements. The crystal orientation detecting method also includes a recording step S4 of recording the relationship between the angular displacements and the intensities of the harmonic 30a after all the intensity data of the harmonic 30a have been acquired. The crystal orientation detecting method further includes a crystal orientation detecting step S5 of detecting the crystal orientation of the nonlinear optical crystal substrate 11 held on the holding table 26 based on the relationship recorded in the recording step S4. These steps of the crystal orientation detecting method according to the present embodiment will be described in detail below.

First, the laser beam applying step S1 will be described below. FIG. 5 schematically illustrates the laser beam applying step S1 in perspective. In the laser beam applying step S1, the nonlinear optical crystal substrate 11 whose crystal orientation is to be detected, i.e., the frame unit where the nonlinear optical crystal substrate 11 is integrally combined with the tape 13 and the annular frame 15, is held on the holding table 26. Then, while the nonlinear optical crystal substrate 11 is being moved in a given direction, the linearly polarized laser beam 28a is applied to the nonlinear optical crystal substrate 11. The laser beam 28a is emitted at an output power level lower than a processing threshold value to prevent the nonlinear optical crystal substrate 11 from being altered due to multiphoton absorption and also to cause the nonlinear optical crystal substrate 11 to produce a harmonic due to the nonlinear optical effect. The laser beam 28a has a wavelength that is transmittable through the nonlinear optical crystal substrate 11 and that produces a harmonic therefrom.

In the harmonic detecting step S2, the harmonic detecting unit 30 detects the harmonic 30a produced from the nonlinear optical crystal substrate 11 due to the nonlinear optical effect of the nonlinear optical crystal thereof at the time the laser beam applying step S1 is carried out. The harmonic detecting step S2 is carried out essentially at the same time as the laser beam applying step S1.

In the crystal orientation detecting method according to the present embodiment, the rotating step S3 of rotating the plane of polarization of the laser beam 28a with respect to the nonlinear optical crystal substrate 11 is carried out, and then the laser beam applying step S1 and the harmonic detecting step S2 are repeated a plurality of times. The crystal orientation of the nonlinear optical crystal substrate 11 is detected based on the relationship between the relative angular displacement of the plane of polarization and the intensity of the harmonic 30a that have been obtained. The rotating step S3 is carried out as many times as required to detect the crystal orientation properly. Specifically, if all of necessary intensity data of the harmonic 30a have not been acquired, the rotating step S3 is carried out. In the rotating step S3, the plane of polarization of the laser beam 28a and the nonlinear optical crystal substrate 11 are relatively rotated about the direction perpendicular to the face side of the nonlinear optical crystal substrate 11. For example, the holding table 26 is rotated through a predetermined angle about the axis perpendicular to the holding surface 26a thereof. Alternatively, if the laser beam applying unit 28 has a half-wave plate and the laser beam 28a passes through the half-wave plate, then the half-wave plate is rotated.

If the plane of polarization of the laser beam 28a and the nonlinear optical crystal substrate 11 are relatively rotated through too large an angular displacement in each occurrence of the rotating step S3, then measured data that are obtained are not enough, tending to result in a reduction in the accuracy with which to detect the crystal orientation. Therefore, the angular displacement in each occurrence of the rotating step S3 should preferably be equal to or smaller than a predetermined angle. For example, the angular displacement in each occurrence of the rotating step S3 should preferably be equal to or smaller than 20° or more preferably be equal to or smaller than 100. After the rotating step S3, the laser beam applying step S1 and the harmonic detecting step S2 are repeated again. FIG. 5 schematically illustrates the manner in which the laser beam applying step S1 and the harmonic detecting step S2 are carried out for the fourth time after the laser beam applying step S1, the harmonic detecting step S2, and the rotating step S3 have been carried out three times. As illustrated in FIG. 5, the laser beam 28a is applied to the nonlinear optical crystal substrate 11 at positions 28b along different directions in the respective occurrences of the laser beam applying step S1.

If the laser beam applying step S1, the harmonic detecting step S2 and the rotating step S3 have been repeated to acquire all of intensity data of the harmonic 30a at the angular displacements where they need to be measured, then the recording step S4 is carried out. In the recording step S4, the relationship between the relative angular displacements of the plane of polarization of the laser beam 28a and the nonlinear optical crystal substrate 11 and the intensities of the harmonic 30a detected in the harmonic detecting step S2 is recorded by the recording unit 34. However, the recording step S4 is not limited to such a recording sequence. The recording step S4 may be carried out each time the laser beam applying step S1 and the harmonic detecting step S2 are carried out once. According to such a modification, the laser beam applying step S1 and the harmonic detecting step S2 are followed by the recording step S4 in which the angular displacement and the intensity of the harmonic are recorded by the recording unit 34. If all of necessary measured data have not been obtained, the rotating step S3 is carried out. If all of necessary measured data have been obtained, the relationship is recorded by the recording unit 34.

Next, the crystal orientation detecting step S5 of detecting the crystal orientation of the nonlinear optical crystal substrate 11 based on the relationship recorded in the recording step S4 is carried out. In the crystal orientation detecting step S5, the reference relationship between the angular displacement of the plane of polarization and the intensity of the harmonic that are obtained by similarly measuring the nonlinear optical crystal substrate 1 whose particular crystal orientation is indicated by the notch 3 or the like is referred to. The reference relationship is acquired by measuring the nonlinear optical crystal substrate 1 whose particular crystal orientation is indicated by the notch 3 or the like. The particular crystal orientation of the nonlinear optical crystal substrate 11 whose particular crystal orientation is unknown because the notch 3 or the like has been lost is detected by checking the relationship recorded in the recording step S4 against the reference relationship. After the crystal orientation detecting step S5 has been carried out, an indication forming step may be carried out to form an indication representing the particular crystal orientation on the nonlinear optical crystal substrate 11 by applying the laser beam from the laser beam applying unit 28 to the nonlinear optical crystal substrate 11 under conditions for processing the nonlinear optical crystal substrate 11.

With the crystal orientation detecting method according to the present embodiment, as described above, the crystal orientation of a nonlinear optical crystal substrate can easily be identified without using an expensive X-ray diffractometer.

The present invention is not limited to the present embodiment illustrated above, but various changes and modifications may be made therein. In the above embodiment, the detection of a particular crystal orientation of the nonlinear optical crystal substrate 11 whose particular crystal orientation is unknown because a notch 3 or an orientation flat 5 indicative of the particular crystal orientation has been lost is illustrated. However, an aspect of the present invention is not limited to the illustrated detection details. The nonlinear optical crystal substrate 11 whose crystal orientation is to be detected may have a notch 3 or the like. The notch 3 or the like that may be defined in the nonlinear optical crystal substrate 11 tends to suffer an error in a certain range with respect to the particular crystal orientation to be indicated by the notch 3 or the like. If the error is large, then it may adversely affect the performance of devices to be formed on the nonlinear optical crystal substrate 11 by referring to the notch 3 or the like. The crystal orientation detecting apparatus 2 according to an aspect of the present invention or the crystal orientation detecting method according to an aspect of the present invention may be used to detecting the magnitude of the error or to detect a true particular crystal orientation. For detecting an error in a range of 10 or less, the relative angular displacement between the plane of polarization of the laser beam 28a and the nonlinear optical crystal substrate is set to 1° or less. In other words, the angular displacement in the rotating step may be 1° or less in the crystal orientation detecting method according to an aspect of the present invention.

In the above embodiment, the reference relationship acquired from the nonlinear optical crystal substrate 1 whose particular crystal orientation is known from the notch 3 or the like is referred to for detecting the particular crystal orientation of the nonlinear optical crystal substrate 11 whose crystal orientation is to be detected. However, an aspect of the present invention is not limited to the illustrated detection details. The reference relationship may not be referred to for detecting the crystal orientation of the nonlinear optical crystal substrate 11 whose crystal orientation is unknown. If the material of the nonlinear optical crystal of the nonlinear optical crystal substrate 11 is known, then the dependency of the intensity of the harmonic produced by the nonlinear optical crystal on the angular displacement of the plane of polarization of the laser beam may be predicted. Specifically, the particular crystal orientation of the nonlinear optical crystal substrate 11 can be detected by directly assessing the relationship between the relative angular displacement between the plane of polarization of the laser beam and the nonlinear optical crystal substrate 11, and the intensity of the harmonic 30a.

In the above embodiment, the particular crystal orientation of the nonlinear optical crystal substrate which is indicated by the notch 3 or the like before it is lost is detected. The crystal orientation detecting apparatus and the crystal orientation detecting method according to aspects of the present invention are not limited to the illustrated detection details. There are instances where devices should be formed on a nonlinear optical crystal substrate along a direction not along the crystal orientation thereof on account of design considerations of circuit patterns on the nonlinear optical crystal substrate. In those instances, an orientation that is different from the particular crystal orientation indicated by the notch 3 or the like, e.g., an orientation suitable for devices to be formed therealong may be detected.

In the above embodiment, the laser beam applying unit 28 applies the laser beam 28a that is transmittable through the nonlinear optical crystal substrate 11 to the nonlinear optical crystal substrate 11. With the crystal orientation detecting apparatus and the crystal orientation detecting method according to aspects of the present invention, the nonlinear optical crystal substrate 11 whose particular crystal orientation has been detected may be processed directly by a laser beam while the detected particular crystal orientation is being referred to.

For example, the laser beam applying unit 28 may apply a laser beam having a wavelength that can be absorbed by the nonlinear optical crystal substrate 11 to the nonlinear optical crystal substrate 11. While the laser beam is being applied to the nonlinear optical crystal substrate 11, the X-axis moving unit 16 may be actuated to move the holding table 26 in one of the X-axis directions, thereby performing ablation on the nonlinear optical crystal substrate 11 in the X-axis direction. Alternatively, the laser beam applying unit 28 may apply a laser beam having a wavelength that can be transmitted through the nonlinear optical crystal substrate 11 to the nonlinear optical crystal substrate 11 while positioning its focal point within the nonlinear optical crystal substrate 11, thereby forming modified layers in the nonlinear optical crystal substrate 11 by way of multiphoton absorption. While placing the focal point of the laser beam within the nonlinear optical crystal substrate 11, the X-axis moving unit 16 may be actuated to move the holding table 26 in one of the X-axis directions, thereby forming modified layers in the nonlinear optical crystal substrate 11 along the X-axis direction.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A crystal orientation detecting apparatus for detecting a crystal orientation of a nonlinear optical crystal substrate, the apparatus comprising:
   a holding table having a holding surface for holding the nonlinear optical crystal substrate thereon;
   a laser beam applying unit applying a linearly polarized laser beam that is transmittable through the nonlinear optical crystal substrate at an output power level for developing a nonlinear optical effect when the laser beam is applied to the nonlinear optical crystal substrate, to the nonlinear optical crystal substrate held on the holding table along a direction perpendicular to a surface of the nonlinear optical crystal substrate;
   a harmonic detecting unit detecting a harmonic produced from the nonlinear optical crystal substrate due to the nonlinear optical effect when the laser beam is applied to the nonlinear optical crystal substrate;
   a recording unit recording a relationship between an angular displacement through which a plane of polarization of the laser beam and the nonlinear optical crystal substrate are rotated relatively to each other about the direction perpendicular to the surface of the nonlinear optical crystal substrate, and an intensity of the harmonic detected by the harmonic detecting unit; and
   a crystal orientation detecting unit detecting the crystal orientation of the nonlinear optical crystal substrate held on the holding table based on the relationship between the angular displacement and the intensity of harmonic recorded by the recording unit.

2. The crystal orientation detecting apparatus according to claim 1, wherein the nonlinear optical crystal substrate includes a lithium niobate substrate or a lithium tantalate substrate.

3. A crystal orientation detecting method of detecting a crystal orientation of a nonlinear optical crystal substrate, the method comprising:
   a laser beam applying step of applying a linearly polarized laser beam that is transmittable through the nonlinear optical crystal substrate at an output power level lower than a processing threshold value of the nonlinear optical crystal substrate, and developing a nonlinear optical effect, to the nonlinear optical crystal substrate, along a direction perpendicular to a surface of the nonlinear optical crystal substrate;
   a harmonic detecting step of detecting a harmonic produced from the nonlinear optical crystal substrate due to the nonlinear optical effect when the laser beam applying step is carried out;
   a rotating step of rotating a plane of polarization of the laser beam and the nonlinear optical crystal substrate relative to each other about the direction perpendicular to the surface of the nonlinear optical crystal substrate;
   a recording step of recording a relationship between an angular displacement through which the plane of polarization of the laser beam and the nonlinear optical crystal substrate are rotated relatively to each other, and an intensity of the harmonic detected in the harmonic detecting step, when the laser beam applying step, the harmonic detecting step, and the rotating step are repeated; and
   a crystal orientation detecting step of detecting the crystal orientation of the nonlinear optical crystal substrate based on the relationship recorded in the recording step.

4. The crystal orientation detecting method according to claim 3, wherein the angular displacement through which the plane of polarization of the laser beam and the nonlinear optical crystal substrate are rotated relatively to each other is 20° or less.

5. The crystal orientation detecting method according to claim 3, wherein the nonlinear optical crystal substrate includes a lithium niobate substrate or a lithium tantalate substrate.

* * * * *